United States Patent
Long et al.

(10) Patent No.: US 7,611,001 B2
(45) Date of Patent: Nov. 3, 2009

(54) PLUGGED FILTER DETECTION SYSTEM

(75) Inventors: Charles F. Long, Pittsboro, IN (US);
Darren J. Weber, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 300 days.

(21) Appl. No.: 11/416,908

(22) Filed: May 3, 2006

(65) Prior Publication Data

US 2007/0256963 A1 Nov. 8, 2007

(51) Int. Cl.
*F16D 25/12* (2006.01)
*B01D 35/143* (2006.01)

(52) U.S. Cl. .................. 192/3.29; 192/30 W; 192/85 R; 210/90

(58) Field of Classification Search ........................ None
See application file for complete search history.

(56) References Cited

U.S. PATENT DOCUMENTS

| | | | | |
|---|---|---|---|---|
| 4,153,003 A | * | 5/1979 | Willis | ......................... 116/268 |
| 5,160,037 A | * | 11/1992 | LeCour | ......................... 210/90 |
| 5,501,791 A | * | 3/1996 | Theisen et al. | ................. 210/90 |
| 6,668,978 B2 | * | 12/2003 | Fessler et al. | ................. 184/6.1 |
| 2008/0053879 A1 | * | 3/2008 | Harris | ......................... 210/90 |

* cited by examiner

*Primary Examiner*—Richard M. Lorence

(57) ABSTRACT

A plugged filter detection system includes a valve housed within a cavity defining an initial inlet for receiving fluid at an inlet pressure before fluid enters a filter, a final inlet for receiving fluid at an outlet pressure after the fluid exits the filter, and a switch port for directing fluid to a switch to activate the switch. The inlet pressure biases the valve in a first direction and the outlet pressure biases the valve in a second direction substantially opposing the first direction. The valve is movable from a first position to a second position to unblock the switch port, thereby allowing the switch to be activated when inlet pressure is greater than outlet pressure. A spring preferably biases the valve in the second direction, such that inlet pressure must be greater than outlet pressure by at least the spring constant to allow switch activation.

5 Claims, 2 Drawing Sheets

PLUGGED FILTER DETECTION SYSTEM

TECHNICAL FIELD

The present invention relates to filters for use within automotive vehicles, and specifically to a system for detecting when a filter is plugged.

BACKGROUND OF THE INVENTION

Motor vehicles use a wide variety of filters. As one example, oil typically flows through an oil filter to remove contamination from an oil stream. Filters are generally designed to be replaceable. However, without an accurate way to measure when a filter should be replaced, consumers may wait too long prior to replacement, or alternatively replace filters too often.

SUMMARY OF THE INVENTION

A plugged filter detection system includes a valve housed within a cavity. The cavity defines an initial inlet for receiving fluid at an inlet pressure before fluid enters a filter, and a final inlet for receiving fluid at an outlet pressure after the fluid exits the filter. The cavity also defines a switch port for directing fluid to a switch to activate the switch. The inlet pressure biases the valve in a first direction and the outlet pressure biases the valve in a second direction substantially opposing the first direction. The valve is movable from a first position, wherein the switch port is blocked, to a second position, wherein the switch port is unblocked, thereby allowing the switch to be activated when inlet pressure is greater than outlet pressure. In one aspect of the invention, the system further includes a spring having a spring constant. The spring biases the valve in the second direction, such that the inlet pressure must be greater than the outlet pressure by at least the spring constant for the valve to move from the first position to the second position. The filter is preferably in parallel with the system.

The system may include a stop to prevent movement of the valve beyond the second position. The cavity may further define an exhaust port, with the exhaust port releasing at least a portion of the fluid when the valve is in the second position. Fluid entering the cavity through the initial inlet may travel through the switch port to activate the switch when the valve is in the second position. Alternatively, the cavity may further define an activation inlet, with fluid entering the cavity through the activation inlet at a control pressure and traveling through the switch port to activate the switch when the valve is in the second position. In this type of embodiment, the valve preferably blocks the activation inlet when the valve is in the first position.

The final inlet may be coupled to a vehicle lockup clutch, such that fluid only enters the cavity through the final inlet when the lockup clutch is engaged. A vehicle controller may be operable to disengage the lockup clutch to reduce the outlet pressure, thus causing the valve to move to the second position if the system is working properly. Failure of the valve to move to the second position when the lockup clutch is disengaged may indicate that the valve and/or the switch are not working properly. The system may further include a pump upstream of the initial inlet, with failure of the valve to move to the second position when the lockup clutch is disengaged indicating that the pump is not working properly.

The valve may create a hysteresis effect within the cavity, such that movement of the valve partially toward the second position causes the valve to complete movement to the second position. As such, the hysteresis effect provides stability within the system. As one example, the valve may include at least two portions of varying diameter, with the varying diameter portions causing the hysteresis effect.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
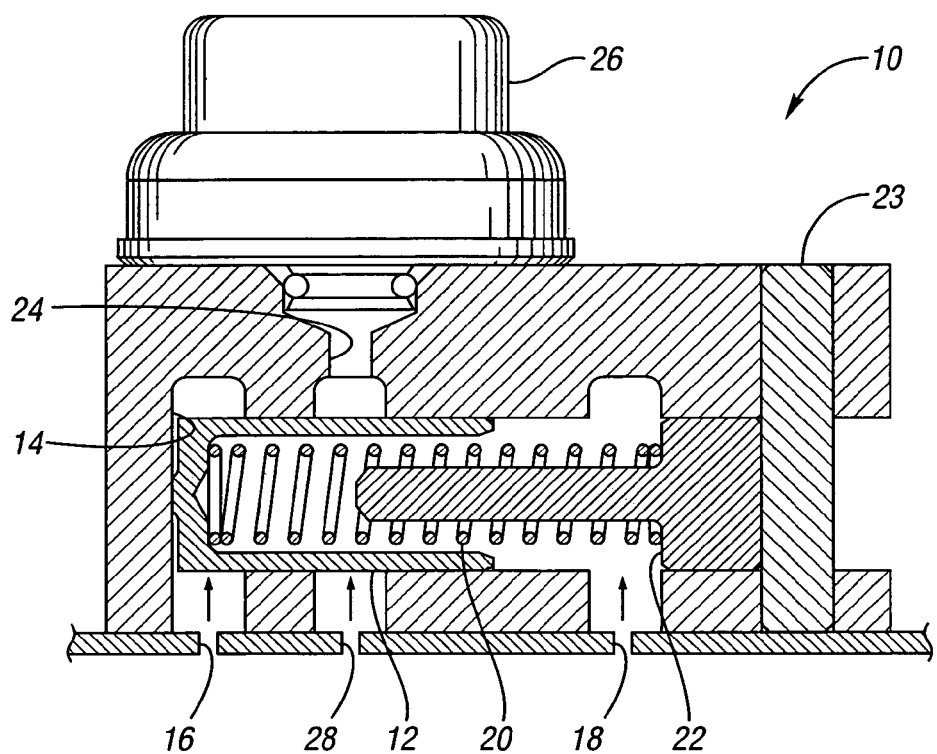
FIG. 1 is a schematic side view of a first embodiment of a plugged filter detection system according to the present invention, showing the valve of the system in a first position indicating an unblocked filter.
Figure 2:
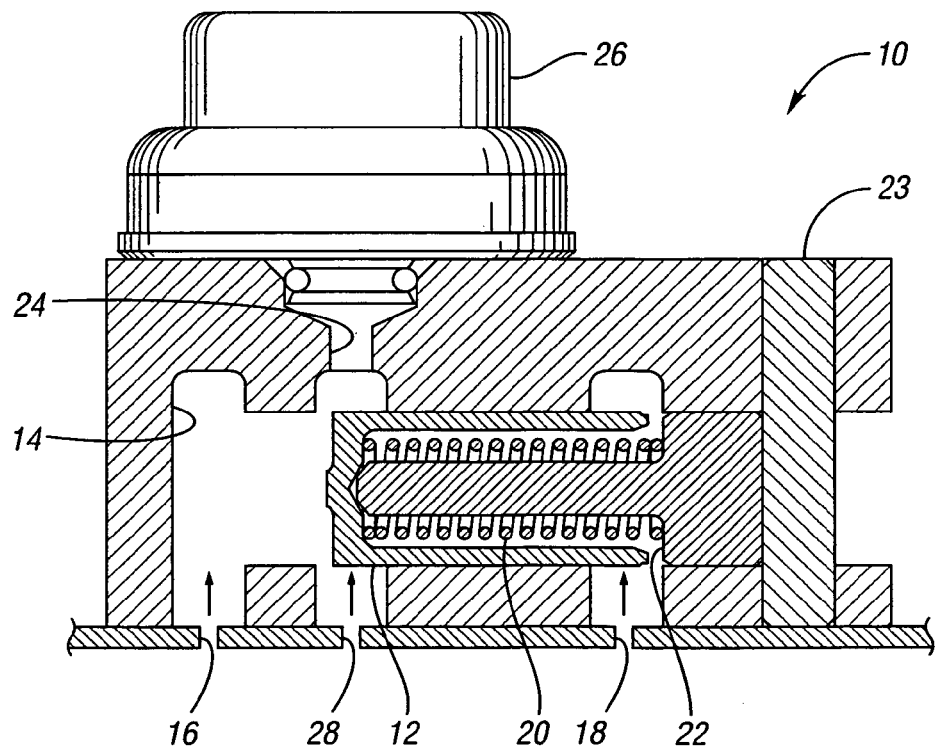
FIG. 2 is a schematic side view of the plugged filter detection system of FIG. 1 showing the valve in a second position indicating a blocked filter.
Figure 3:
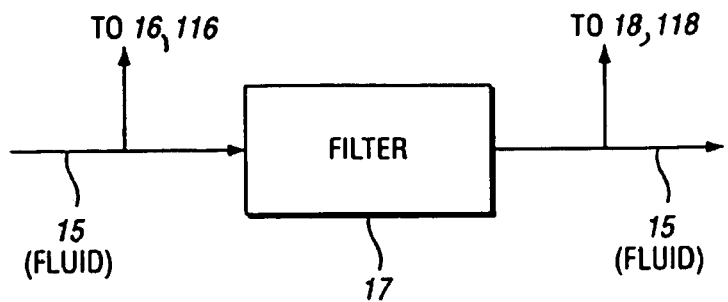
FIG. 3 is a schematic view of fluid entering and exiting a filter.

Referring to the drawings, wherein like reference numbers refer to like components, FIGS. 1 and 2 present a side view of a first embodiment of a plugged filter detection system 10 according to the present invention. A valve 12 housed within a cavity 14 is movable from a first position, shown in FIG. 1, to a second position, shown in FIG. 2. The cavity 14 defines an initial inlet 16 and a final inlet 18. As shown schematically in FIG. 3, fluid 15 enters the cavity 14 of FIG. 1 through the initial inlet 16 at an inlet pressure just before entering a filter 17, and through the final inlet 18 at an outlet pressure upon exiting the filter 17. Thus, the system 10 is in parallel with the filter 17. For example, oil within a motor vehicle could enter the inlets 16, 18 upon entry to and exit from an oil filter. It should be noted that fluid may enter the cavity 14 other than as described herein. For example, typically the system 10 will be used within a motor vehicle and be somewhat saturated with oil. Thus it is important to note that the system works based on fluid entering the initial inlet 16 at an inlet pressure, and through the final inlet 18 at an outlet pressure.

Turning back to FIGS. 1 and 2, fluid entering the initial inlet 16 impinges upon the valve 12 at the inlet pressure, tending to push the valve 12 to the right with respect to FIGS. 1 and 2. Similarly, fluid entering the final inlet 18 impinges upon the valve 12 at the outlet pressure, tending to push the valve 12 left with respect to FIGS. 1 and 2. If the fluid lost no pressure within the filter, such that inlet pressure was equal to outlet pressure, the forces upon the valve 12 at inlet 16 would be equal to the forces upon the valve 12 at inlet 18, and the valve 12 would remain in the first position. If the fluid loses pressure within the filter, the pressure on the valve 12 at inlet 16 (i.e., the inlet pressure) would be greater than the pressure on the valve 12 at inlet 18 (i.e., the outlet pressure), and the inlet pressure would push the valve toward the right with respect to FIGS. 1 and 2 to the second position, wherein the valve 12 abuts a stop 22. A pin 23 may keep the stop 22 in position. Movement of the valve 12 to the second position opens a switch port 24, allowing fluid to flow from the cavity 14 to a switch 26, thus activating the switch 26 to indicate an undesirable fluid pressure drop due to a plugged filter.

In practice, fluid will experience at least a partial drop in pressure upon travel through a filter, even when the filter is not plugged. Also, a small amount of filter clogging may not necessitate filter cleaning or replacement. Thus, a spring 20 biases the valve 12 toward the left with respect to FIGS. 1 and 2, with the spring 20 having a spring constant equal to the allowable pressure drop. For instance, the spring 20 may have a spring constant of 25 psi, indicating that fluid may lose 25 psi of pressure within the filter without opening the switch port 24 to trigger the switch 26. The cavity 14 also preferably defines an exhaust port 28. When the valve 12 is in the second position, the exhaust port 28 opens to allow a portion of the fluid to exit therethrough. Dissipation of fluid through the exhaust port 28 increases fatigue life of the switch 26 by reducing the pressure fluid traveling through the switch port 24 exerts on the switch 26. The relative size of the initial and final inlets 16, 18 determines the fluid pressure exerted on the switch 26. For example, if the initial and final inlets 16, 18 are similarly sized, with an inlet pressure of 230 psi and an outlet pressure of 10 psi, the initial and final inlets 16, 18 will share a pressure drop of 110 psi ([230 psi–10 psi]/2), and the pressure at the switch 26 will be 120 psi ([230 psi+10 psi]/2).

Figures 4, 5:
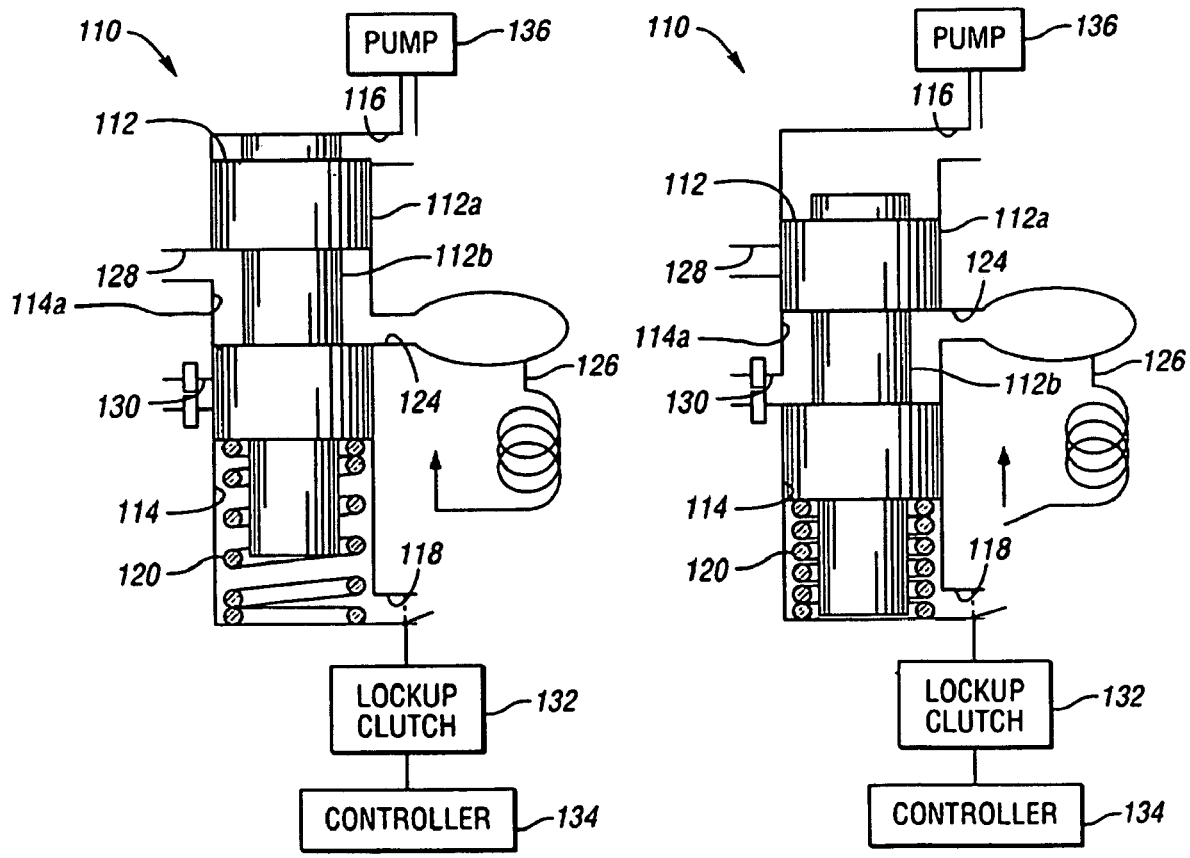
FIG. 4 is a schematic side view of a second embodiment of a plugged filter detection system according to the present invention, showing a valve of the system in a first position indicating an unblocked filter.
FIG. 5 is a schematic side view of the plugged filter detection system of FIG. 4 showing the valve in a second position indicating a blocked filter.

FIGS. 4 and 5 present side views of a second embodiment of a plugged filter detection device 110. A valve 112 housed within a cavity 114 is movable from a first position, shown in FIG. 4, to a second position, shown in FIG. 5. The valve 112 preferably includes a pair of larger diameter portions 112a and a smaller diameter portion 112b disposed between the larger diameter portions 112a. The valve 112 defines a secondary cavity 114a between the larger diameter portions 112a. The cavity 114 defines an initial inlet 116, a final inlet 118, an exhaust port 128, a switch port 124, and an activation inlet 130. Fluid enters the cavity 114 through the initial inlet 116 at an inlet pressure just before entering a filter (i.e., 17 of FIG. 3), and enters through the final inlet 118 at an outlet pressure upon exiting the filter. Fluid entering the initial inlet 116 at the inlet pressure impinges upon the valve 112, tending to push the valve 112 downward with respect to FIGS. 3 and 4, while fluid entering the final inlet 118 at the outlet pressure impinges upon the valve 112, tending to push the valve upward with respect to FIGS. 3 and 4. A spring 120 having a spring constant equivalent to the desired allowable pressure drop biases the valve 112 upward.

If the fluid pressure of the fluid entering the initial inlet 116 is greater than the fluid pressure of the fluid entering the final inlet 118 by enough to overcome the force of the spring 120, the valve 112 will move downward to the second position, thereby uncovering the activation inlet 130 and allowing fluid to enter the secondary cavity 114a therethrough. Fluid flows through the activation inlet 130 at a steady predetermined control pressure, for example 100 psi. Fluid from the activation inlet 130 then travels around the smaller diameter portion 112b of the valve 112 through the switch port 124 to activate a switch 126 indicating an undesirable drop in fluid pressure due to a plugged filter. The larger diameter portion 112a of the valve 112 blocks fluid that has entered the cavity 114 through the inlet port 116 from reaching the switch 126 in this embodiment, thereby allowing even greater control of the force at which fluid hits the switch 126. Additionally, using varying diameter portions 112a, 112b for the valve 112 also causes a hysteresis effect within the cavity 114, such that once the valve 112 proceeds downward with respect to FIGS. 4 and 5 beyond a half-way position, the valve hysteresis effect will cause the valve 112 to snap downward the rest of the way to the second position. The hysteresis effect will further cause the valve 112 to remain in the second position until the pressure drop across the filter is reduced enough to adequately overcome the pressure produced by the differential area of the two portions 112a, 112b. It can thus be seen that the hysteresis effect produced by the use of varying diameter portions 112a, 112b provides stability within the system 110 by preventing the valve 112 from cycling between the first and second positions.

In addition to detecting a plugged filter, the second embodiment 110 of the present invention provides novel diagnostic capabilities. A vehicle includes a logic valve which selectively activates a lockup clutch 132. When the lockup clutch 132 is engaged, a vehicle torque converter clutch is pressurized. Conversely, when the lockup clutch 132 is disengaged, the torque converter clutch is exhausted. Preferably, the final inlet 118 is coupled to the lockup clutch 132, as shown schematically in FIGS. 4 and 5, such that fluid pressurizes the cavity 114 through the final inlet 118 only when the lockup clutch 132 is engaged. When a vehicle engine is started, typically the lockup clutch 132 is disengaged. Thus, fluid enters the cavity 114 through the initial inlet 116, but not through the final inlet 118, causing the valve 112 to move to the second position, thereby activating the switch 126. If the switch 126 does not activate upon engine start, that indicates to a vehicle controller 134 that either the valve 112 is stuck in the first position, or the switch 126 is broken. When the controller 134 activates the logic valve to engage the lockup clutch 132, fluid should pressurize the cavity 114 through the final inlet 118, thereby moving the valve 112 upward once again and deactivating the switch 126 as the activation inlet 130 becomes blocked. If the switch 126 does not turn off, that indicates to the vehicle controller 134 either that the valve 112 is stuck downward, the filter is plugged, or there is some problem with the connection between the final inlet 118 and the lockup clutch 132. Failure of the valve 112 to move from the first position to the second position when the lockup clutch 132 is disengaged may also indicate a problem with a vehicle pump 136. Specifically, if the pump 136 has not primed, or has lost its prime, fluid within the system 110 will not be pressurized, and minimal fluid will enter the cavity 114. Thus if the lockup clutch 132 is disengaged to prevent fluid from entering the cavity 114 through the final inlet 118, but the pump 136 is not working properly such that fluid does not enter the cavity 114 through the initial inlet 118, the valve 112 will remain in the first position. It can thus be seen that the present invention provides diagnostic capabilities beyond detection of a plugged filter.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A plugged filter detection system comprising:
   a valve housed within a cavity, said cavity defining an initial inlet for receiving fluid at an inlet pressure before said fluid enters a filter, a final inlet for receiving fluid at an outlet pressure after said fluid exits said filter;
   wherein said valve includes a pair of larger diameter portions and a smaller diameter portion extending between said larger diameter portions to define a secondary cavity between said larger diameter portions such that said fluid is prevented from flowing around said larger diameter portions between said cavity and said secondary cavity;

an activation inlet, wherein fluid enters said secondary cavity through said activation inlet at a control pressure;

a switch port for directing fluid in said secondary cavity to a switch thereby activating said switch;

wherein said inlet pressure biases said valve in a first direction and said outlet pressure biases said valve in a second direction substantially opposing said first direction; said valve being movable from a first position, wherein said activation inlet is blocked, to a second position, wherein said activation inlet is unblocked, thereby allowing said switch to be activated when said inlet pressure is greater than said outlet pressure; and wherein said final inlet is coupled to a vehicle lockup clutch such that said fluid only enters said cavity through said final inlet when said lockup clutch is engaged;

wherein failure of said valve to move from said first position to said second position upon disengagement of said lockup clutch indicates that at least one of said valve and said switch are not working properly.

2. The system of claim 1, further including a spring having a spring constant, said spring biasing said valve in said second direction, such that said inlet pressure must be greater than said outlet pressure by at least said spring constant for said valve to move from said first position to said second position.

3. The system of claim 1, further including a vehicle controller operable to disengage said lockup clutch to reduce outlet pressure, thus causing said valve to move to said second position if said system is working properly.

4. A plugged filter detection system comprising:

a valve housed within a cavity, said cavity defining an initial inlet for receiving fluid at an inlet pressure before said fluid enters a filter, a final inlet for receiving fluid at an outlet pressure after said fluid exits said filter;

wherein said valve includes a pair of larger diameter portions and a smaller diameter portion extending between said larger diameter portions to define a secondary cavity between said larger diameter portions such that said fluid is prevented from flowing around said larger diameter portions between said cavity and said secondary cavity;

an activation inlet, wherein fluid enters said secondary cavity through said activation inlet at a control pressure; and a switch port for directing fluid in said secondary cavity to a switch to activate said switch, wherein an inlet pressure biases said valve in a first direction and an outlet pressure biases said valve in a second direction substantially opposing said first direction;

a spring having a spring constant, said spring further biasing said valve in said second direction;

said valve being movable from a first position, wherein said activation inlet is blocked, to a second position, wherein said activation inlet is unblocked, when said inlet pressure is greater than said outlet pressure by at least said spring constant; and wherein said final inlet is coupled to a vehicle lockup clutch such that fluid only enters said cavity through said final inlet when said vehicle lockup clutch is engaged, and wherein a vehicle controller is operable to disengage said lockup clutch to reduce outlet pressure, thus causing said valve to move to said second position if said system is working properly;

wherein failure of said valve to move from said first position to said second position upon disengagement of said lockup clutch indicates that at least one of said valve and said switch are not working properly.

5. The system of claim 4, wherein said system includes a pump upstream of said initial inlet, and wherein failure of said valve to move from said first position to said second position upon disengagement of said lockup clutch indicates that said pump is not working properly.

* * * * *